(12) United States Patent
Aoki

(10) Patent No.: US 7,965,258 B2
(45) Date of Patent: Jun. 21, 2011

(54) SLIDE-OUT INFORMATION DISPLAY

(75) Inventor: Paul M. Aoki, Berkeley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/897,853

(22) Filed: Oct. 5, 2010

(65) Prior Publication Data

US 2011/0018785 A1 Jan. 27, 2011

Related U.S. Application Data

(62) Division of application No. 11/638,640, filed on Dec. 13, 2006, now Pat. No. 7,830,333.

(51) Int. Cl.
*G09G 5/00* (2006.01)
*H05K 5/00* (2006.01)

(52) U.S. Cl. ................... 345/1.3; 361/679.21

(58) Field of Classification Search ............ 345/1.1–3.4; 361/679.21
See application file for complete search history.

(56) References Cited

U.S. PATENT DOCUMENTS

| | | | |
|---|---|---|---|
| 5,734,513 A | 3/1998 | Wang et al. |
| 5,835,090 A | 11/1998 | Clark et al. |
| 6,088,220 A | 7/2000 | Katz |
| 6,498,597 B1 | 12/2002 | Sawano |
| 6,643,124 B1 | 11/2003 | Wilk |
| 6,771,232 B2 | 8/2004 | Fujieda et al. |
| 6,859,219 B1 | 2/2005 | Sall |
| 6,931,265 B2 | 8/2005 | Reyes et al. |
| 6,940,497 B2 | 9/2005 | Vincent et al. |
| 7,238,397 B2 | 7/2007 | Iftime et al. |
| 7,489,286 B2 | 2/2009 | Kawase et al. |
| 2002/0070910 A1 * | 6/2002 | Fujieda et al. ................. 345/85 |
| 2004/0135738 A1 | 7/2004 | Kim et al. |
| 2005/0110702 A1 | 5/2005 | Aoki et al. |
| 2005/0248501 A1 | 11/2005 | Kim |
| 2005/0253775 A1 | 11/2005 | Stewart |
| 2006/0082518 A1 | 4/2006 | Ram |
| 2006/0109197 A1 | 5/2006 | Kuwabara et al. |
| 2006/0192726 A1 * | 8/2006 | Huitema et al. ............... 345/1.1 |
| 2008/0144265 A1 | 6/2008 | Aoki |

* cited by examiner

*Primary Examiner* — Stephen G Sherman
(74) *Attorney, Agent, or Firm* — Fay Sharpe LLP

(57) ABSTRACT

Slide-out and roll-up information displays and methods supply enlarged viewing areas. A slide-out information display device includes stacked display segments wherein each of the display segments except one is at least partially covered by the others. Separable bezel segments support the display segments, the stacked display segments being uncovered when the bezel segments are separated from a collapsed configuration to an un-collapsed configuration for use by a user. A roll-up display device includes flexible display membranes. Scrolling assemblies in the roll-up display include rotatably mounted scrolling assembly mechanisms for rolling up the flexible display membranes. Some scrolling assemblies are movable and can be extended beyond the housing members. At least one display membrane being covered by at least one other display membrane when the movable scrolling assemblies are not extended, and the covered display membranes being uncovered when the movable scrolling assemblies are extended.

8 Claims, 13 Drawing Sheets ns into a
SLIDE-OUT INFORMATION DISPLAY

CROSS REFERENCE TO RELATED PATENTS AND APPLICATIONS

This is a divisional application of U.S. patent application Ser. No. 11/638,640, filed Dec. 13, 2006, entitled "Slide-Out Information Display", by Paul M. Aoki, et al., the disclosure of which is hereby incorporated by reference in its entirety.

BACKGROUND

Portable computing devices such as, e.g., personal digital assistants, display-enhanced cellular telephones, portable electronic document readers, and interactive electronic guidebooks are typically produced with displays that are limited in visual area because the portable computing devices are preferably designed to be conveniently carried in the human hand. This is particularly true where the display is integrated with the body of the portable electronic device.

Accordingly, it would be desirable to provide a display that can be stored in a small space, but can be subsequently opened into a form that is much wider than the device to which it is attached. Preferably, an opened display for a portable device should be rigid enough that the user does not have to provide separate support for the display or set the portable device on a flat supporting surface. It would be additionally advantageous for the display to be easily opened with one hand since the other hand is usually used to support the portable computing device.

There has been prior work on displays that can be expanded to a greater viewing area. For example, FIG. 1 shows a known four-segment hinged display device 100 as described in U.S. Pat. No. 6,088,220 titled Pocket Computer with Full-Size Keyboard. Each half of the display 100, as shown, has been folded out along a respective pair of horizontal hinge arrangements 120-180. Hinged displays of this kind require repetitive manual actions to open or close the display, and generally involve flex cabling across each hinge arrangement which introduces additional potential failure points to the display. Further, this type of display arrangement multiplies the number of segment boundaries which results in visible seams in the display unless additional steps are taken.

Published U.S. patent application Ser. No. 10/719,300, titled Collapsible Display Device and Methods for Using the Same, discloses a number of fold-up display geometries that use non-right-angle folds, twists and pivots to reduce the number of manual actions needed to open the display. For example, FIG. 2 shows a display 200 which consists of a number of display segments 220 that open around a pivot 240. Also disclosed are fold-up displays similar to folding fans, twist-up displays using spring-like exterior rings, pop-up displays that apply "pop-up book" techniques, and umbrella displays that apply a hub-spoke umbrella action.

Roll-up displays utilizing flexible display materials have been proposed such as, e.g., the roll-up display 300 shown in FIG. 3 and disclosed in U.S. Pat. No. 6,498,597 titled Continuously Displayable Scroll-Type Display. The roll-up display device 300 utilizes a scroll-like flexible display medium 320 which is stored in a cylindrical magazine 340. A practical issue arises from using a flexible display material which is preferably viewed flat, and which is also sometimes fragile.

One approach is to utilize an accordion-like support structure similar to the one disclosed in U.S. patent application Ser. No. 10/012,558 titled Mobile Terminal Device, Content Distribution System, Content Distribution Method, and Program for Executing Method Thereof. With reference to FIG. 4, the roll-up display device 400 includes an accordion-like supporting structure 420 for supporting the flexible display material 440. Other roll-up displays use a "bamboo scroll" type of supporting structure which provides lateral support, but does not provide longitudinal support. It should be noted that, while the roll-up configuration has the advantage of expanding for use and collapsing to a smaller area for storage, the area to which it collapses is still limited in its degrees of freedom by its constant width, as is the area to which it expands. In other words, although the display area can be changed in its length dimension, its width dimension is generally fixed.

Accordingly, it would be advantageous to introduce display configurations that overcome certain disadvantages of existing technologies.

INCORPORATION BY REFERENCE

Each of the following U.S. patent applications and U.S. patents is incorporated in its entirety by reference herein:
Pocket Computer with Full-Size Keyboard, U.S. Pat. No. 6,088,220, filed Oct. 2, 1997;
Collapsible Display Device and Methods for Using the Same, U.S. patent application Ser. No. 10/719,300, filed Nov. 21, 2003;
Continuously Displayable Scroll-Type Display, U.S. Pat. No. 6,498,597, filed Oct. 28, 1999;
Mobile Terminal Device, Content Distribution System, Content Distribution Method, and Program for Executing Method Thereof, U.S. patent application Ser. No. 10/012,558, filed Dec. 12, 2001;
Black/White Cholesteric Bistable Display with Increased White Reflectivity, U.S. patent application Ser. No. 11/004,752 filed Dec. 3, 2004;
Electronic Apparatus With a Foldable Display, U.S. Pat. No. 5,734,513, filed Apr. 3, 1996; and
Desktop Manager for Graphical User Interface Based System with Enhanced Desktop, U.S. Pat. No. 5,835,090, filed Oct. 17, 1996.

BRIEF DESCRIPTION

An expanding electronic display is provided which includes two display sections, one of the two display sections being configured to be hidden from view when the expanding electronic display is in a first position. A movement mechanism permits movement of one of the display sections into a relationship to the remaining display section which permits viewing of both display sections concurrently.

A slide-out information display device is also provided which includes stacked display segments. Each of the display segments except one is at least partially covered by one or more of the remaining display segments. Bezel segments are provided for supporting the display segments, and are arranged such that the bezel segments are separable from each other in at least one direction, the stacked display segments being uncovered when the bezel segments are separated from a collapsed configuration to an un-collapsed configuration for use by a user. The uncovered display segments thereby provide an enlarged viewing area.

A roll-up display device is also provided which includes flexible display membranes. A pair of scrolling assemblies is included, one of which includes a rotatably mounted scrolling assembly mechanism for rolling up a first flexible display membrane. Additional scrolling assemblies are also provided, one of which includes a second rotatably mounted scrolling assembly mechanism for rolling up a second flexible display membrane. The additional scrolling assemblies are movable in at least one direction and can be extended beyond the first pair of scrolling assemblies, the second display membrane being covered by the first display membrane when the additional scrolling assemblies are not extended, and the second display membrane being uncovered when the additional scrolling assemblies are extended, thereby providing an enlarged viewing area.

A method is also provided for forming a slide-out information display. The method includes stacking display segments, each of the display segments except one of the plurality of display segments at least partially covered by one or more of the remaining display segments. The plurality of display segments are supported in at least two bezel segments, and the bezel segments are interconnected such that the bezel segments are separable in at least one direction. The covered stacked display segments are uncovered when the bezel segments are moved from a collapsed configuration to an uncollapsed configuration by a user, the uncovered display segments thereby providing an enlarged viewing area.

A method is further provided for forming a roll-up display. The method includes providing a pair of scrolling assemblies, at least one scrolling assembly including a rotatably mounted scrolling assembly mechanism for rolling up a flexible display membrane. An additional pair of scrolling assemblies is provided, one of the additional scrolling assemblies including a second rotatably mounted scrolling assembly mechanism for rolling up a second flexible display membrane. The additional scrolling assemblies are movable in at least one direction and can be extended beyond the first pair of scrolling assemblies, the second display membrane being covered by the first display membrane when the additional scrolling assemblies are not extended, and the second display membrane being uncovered when the additional scrolling assemblies are extended by a user, thereby providing an enlarged viewing area.

DETAILED DESCRIPTION

Referring now to FIGS. 5-16, slide-out information displays corresponding to concepts of the present application, and distinct from those discussed in connection with FIGS. 1-4, are more particularly described.

Figure 1:
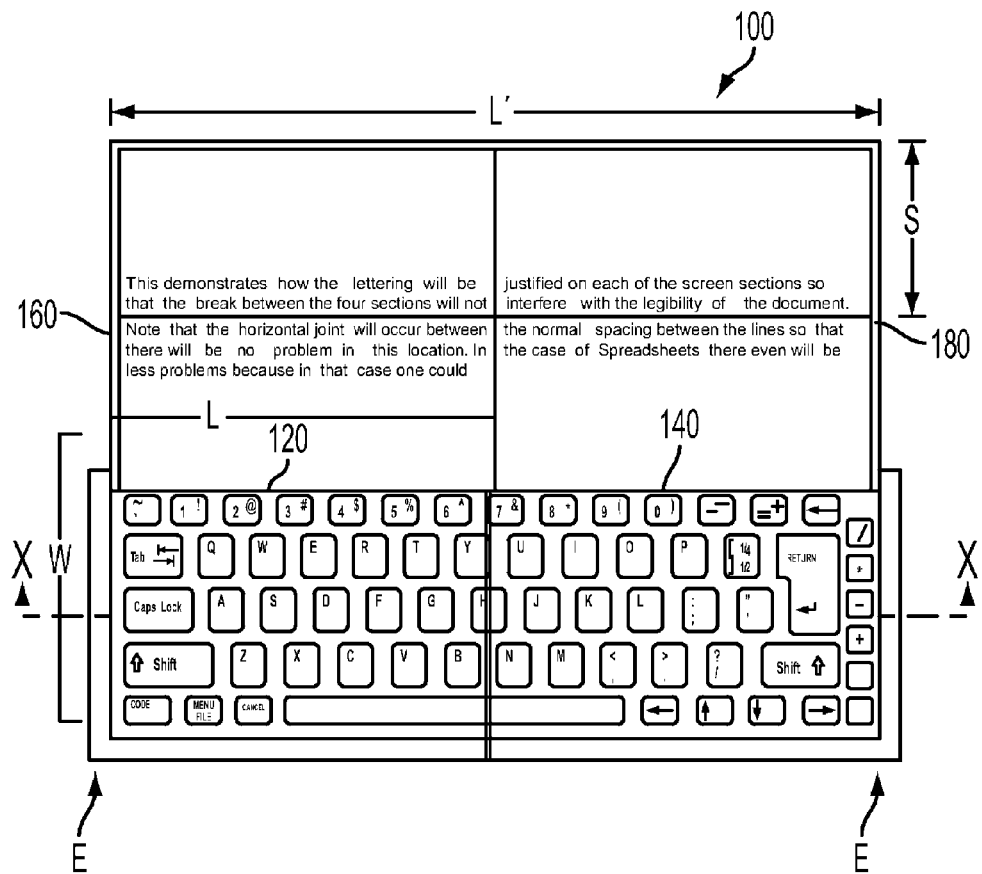
FIG. 1 is a known four-segment hinged display device.
Figure 2:
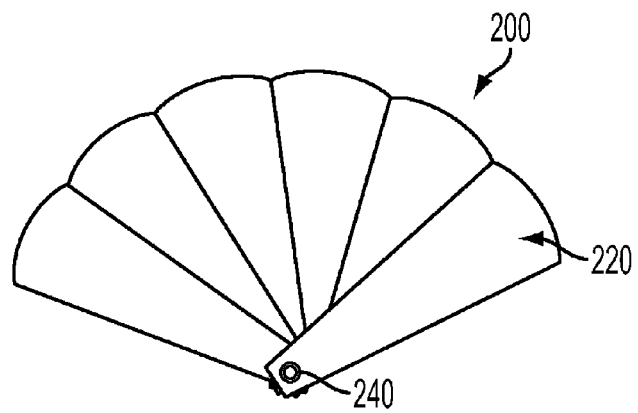
FIG. 2 is a known display which consists of a number of display segments that open around a pivot.
Figure 3:
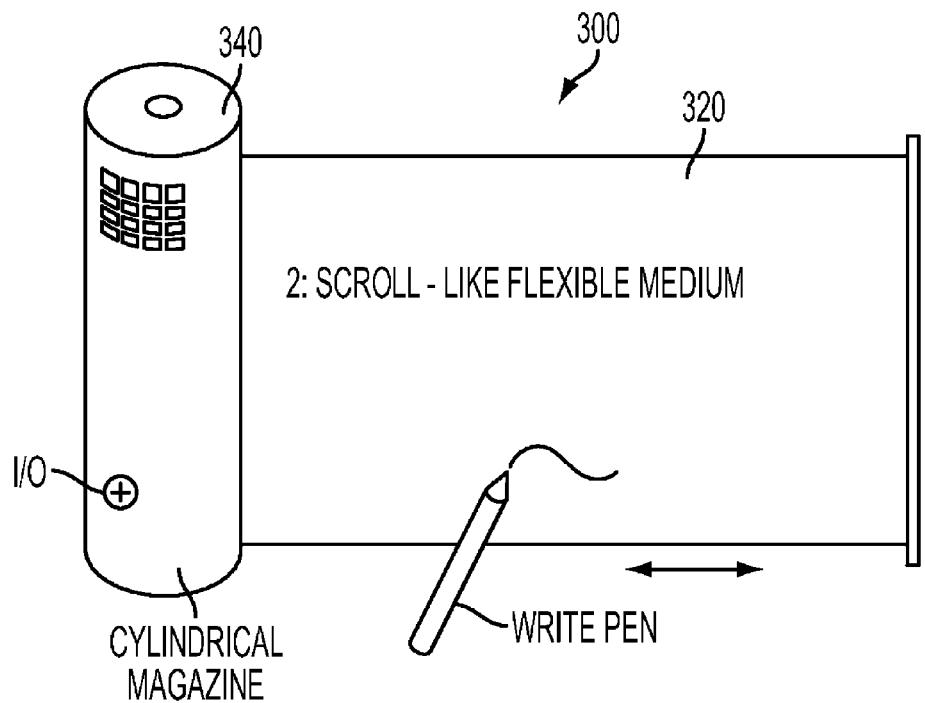
FIG. 3 is a known roll-up display.
Figure 4:
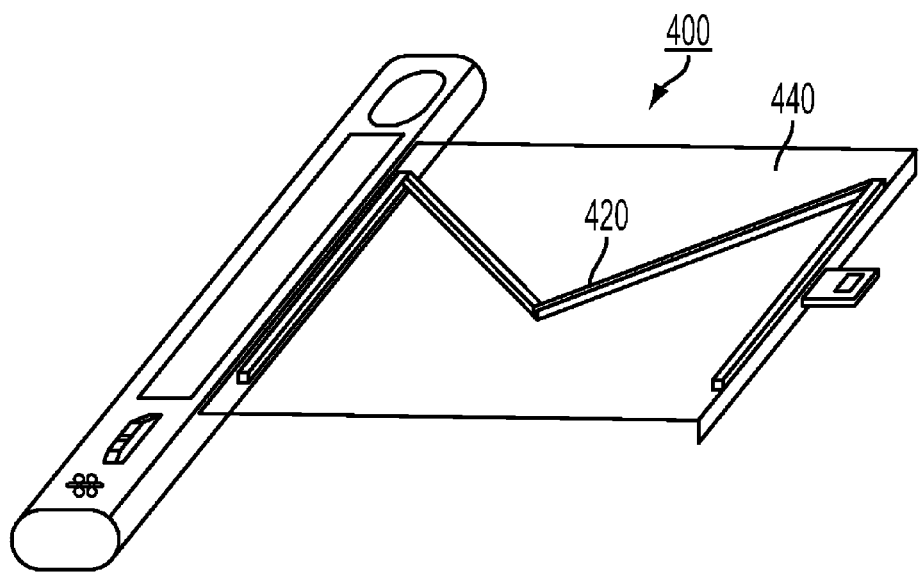
FIG. 4 is a known roll-up display including an accordion-like support structure.
Figure 5:
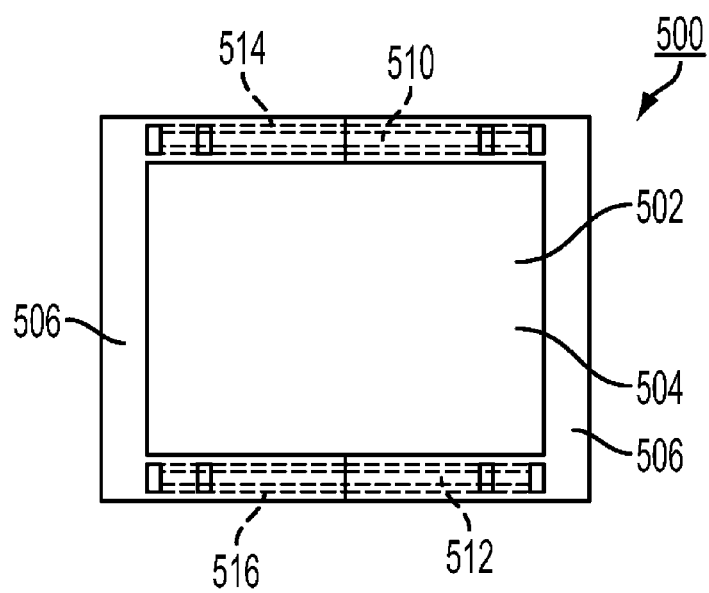
FIG. 5 is a first configuration for a slide-out information display.

With reference now to FIG. 5, a first configuration 500 for a slide-out information display is shown. The first configuration 500 is shown in a closed position. The slide-out information display includes a set of stacked display panels 502, 504 wherein the first display panel 502 is visible in the figure and the second display panel 504 is stacked beneath a first display panel and is not visible in the figure. The slide-out information display includes interconnected frame members or bezel segments 506, 508 for supporting the first and second display panels. The frame members in this embodiment are interconnected by an upper support member 510 and a lower support member 512 which reside in respective frame channels 514, 516 for maintaining the first and second frame members in proper relationship with respect to each other. It is to be understood that the connecting members 510, 512 residing in the respective channels 514, 516 are exemplary representations, and any suitable interconnecting arrangement as known in the art is included within the scope of the present disclosure. It is to be further understood that the display panels 502, 504 can be any rigid or semi-rigid type of display panel known in the art. Available components for the display panels will be readily apparent to one of skill in the art With reference now to FIG. 6, the slide-out information display 500 is shown in an operable, expanded configuration. In this configuration, the second display panel 504 is positioned to the right of first display panel 502 as viewed when observing the display panels as shown in the figure. However, because the second display panel 504 is housed directly below display panel 502, there remains a slight offset between the planes of the two panels at the position designated by the boundary line indicated by the numeral 518, although the effect of the small offset is preferably negligible.

Figure 6:
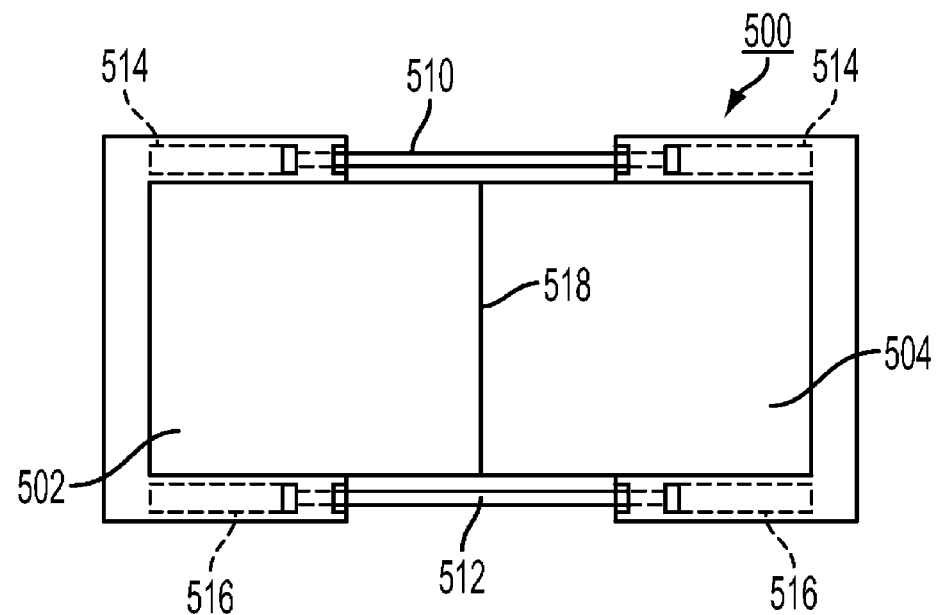
FIG. 6 is the first configuration for a slide-out information display shown in an operable, expanded configuration.
Figure 7:
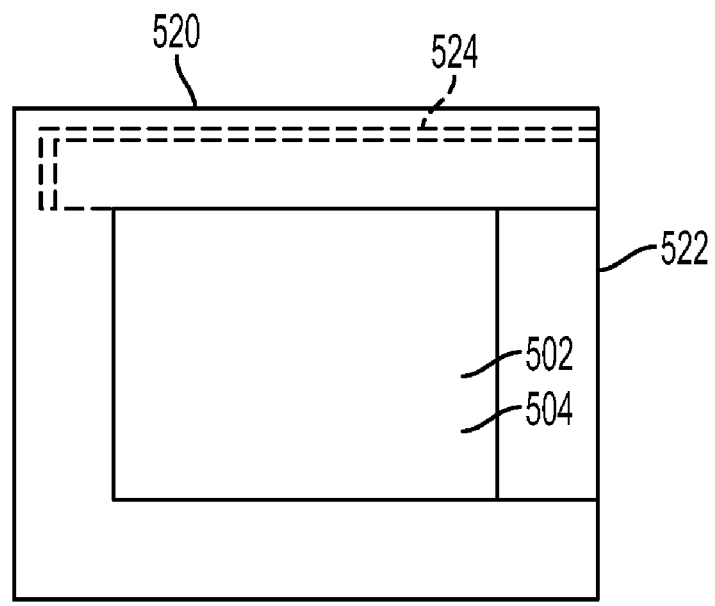
FIG. 7 is a second configuration for a slide-out information display.
Figure 8:
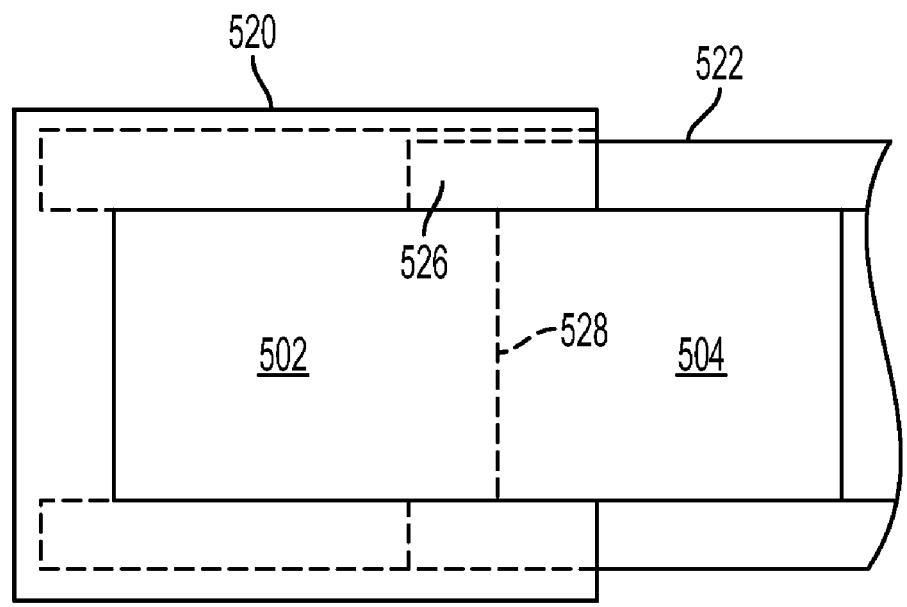
FIG. 8 is the second configuration for a slide-out information display expanded for use.

With reference now to FIG. 7, a second exemplary configuration is shown similar to the previously described configuration shown in FIG. 6 which, however, eliminates the need for supporting elements 510, 512. In this second configuration, a first bezel segment 520 is configured such that a second bezel segment 522 rides in a hollow channel region 524 of the first bezel segment. As shown now in FIG. 8, when the second configuration of the slide-out information display is expanded, a region of overlap designated by numeral 526 provides support for the second bezel segment 522. In this second arrangement, as in the first arrangement, a slight offset remains at the boundary line designated by numeral 528.

Figure 9:
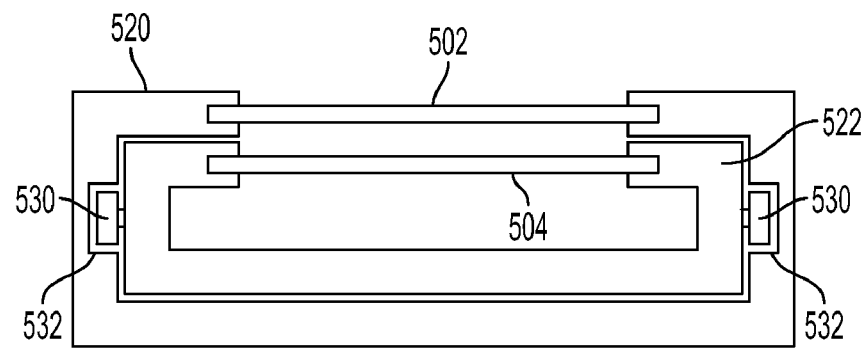
FIG. 9 is a third available configuration of a slide-out information display.
Figure 10:
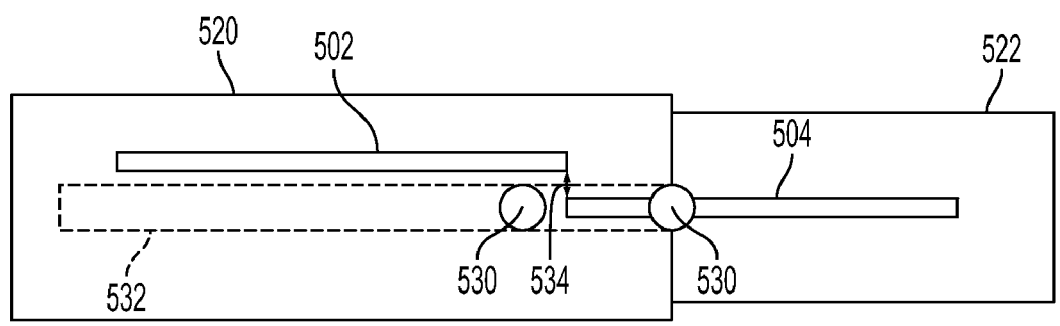
FIG. 10 is a side view of the third available configuration of a slide-out information display.

With reference now to FIG. 9, a third available configuration of a slide-out information display is shown. This third configuration is like the configuration shown with reference to FIG. 8, however, guide rollers 530 have been added to each side of the second bezel segment 522 for supporting the second bezel segment. A first bezel segment 520 has, consequently, been provided with guide channels 532 for supporting the guide rollers 530. With reference to FIG. 10, a side view of the third available configuration is shown in an expanded operable position. In the expanded configuration, the guide rollers 530 continue to provide support for the second bezel segment 522. It is to be noted that, as in the previous configurations, a slight offset 534 remains.

Figure 11:
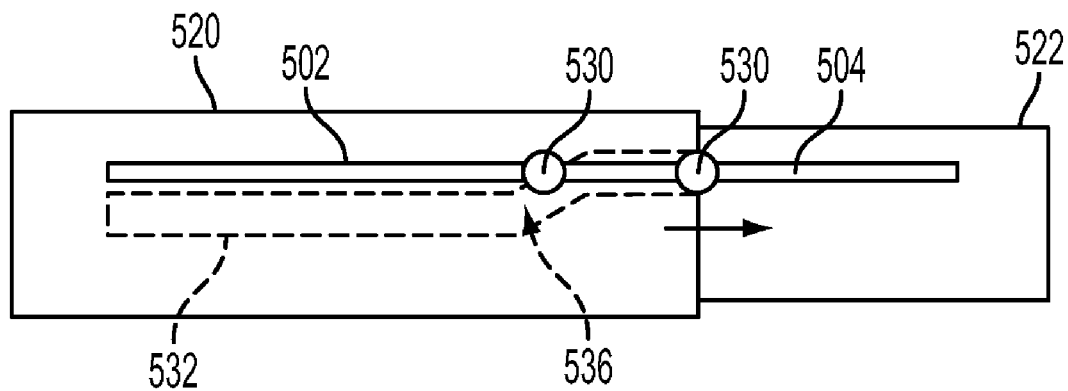
FIG. 11 is a fourth available configuration of a slide-out information display.

With reference now to FIG. 11, and continuing reference to FIG. 10, a fourth available configuration of the slide-out information display is shown which eliminates the undesirable offset 534 of the previous configuration. This fourth configuration is identical in all respects to the third configuration except that the guide channels 532 are provided with a curved portion 536 which causes the second bezel segment 522 to be elevated with respect to the first bezel segment 520 when expanded, thereby eliminating the undesirable offset 534, aligning the display panel segments on the same plane. It is to be appreciated that other interconnecting arrangements for eliminating the undesirable offset are known in the art and are included within the scope of the present disclosure.

Figure 12:
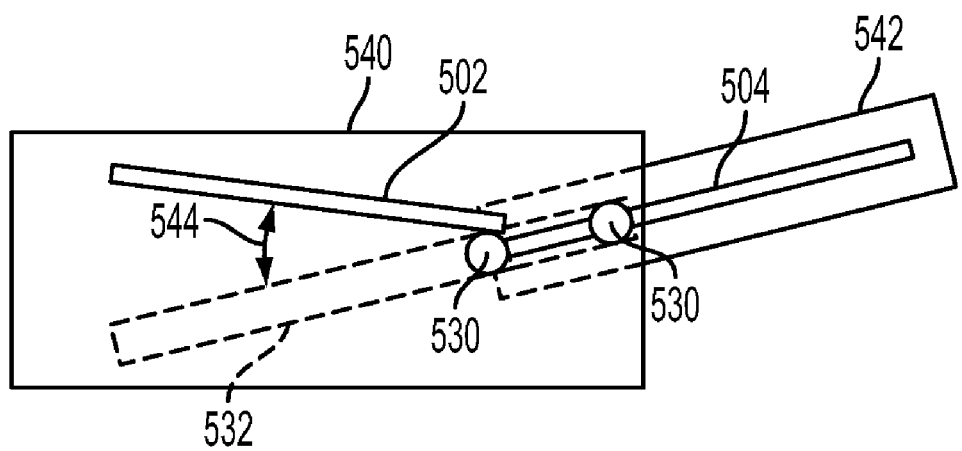
FIG. 12 is a fifth available configuration of a slide-out information display.

With reference now to FIG. 12, a fifth available configuration of a slide-out information display is shown. It is an object of this configuration to provide the user with a slightly convex viewing arrangement of the first and second display panels 502, 504. This arrangement is similar to the previously shown arrangements except that the guide channel 532 is configured at an angle 544 with respect to the first display panel 502 thereby providing a convex viewing arrangement when expanded to the operable position as shown in the figure. It is to be appreciated that this configuration may also be provided with a curved region 536 as shown in the previous arrangement to eliminate the undesirable offset between the first and second display channels 502, 504 when expanded to the operable position.

Figure 13:
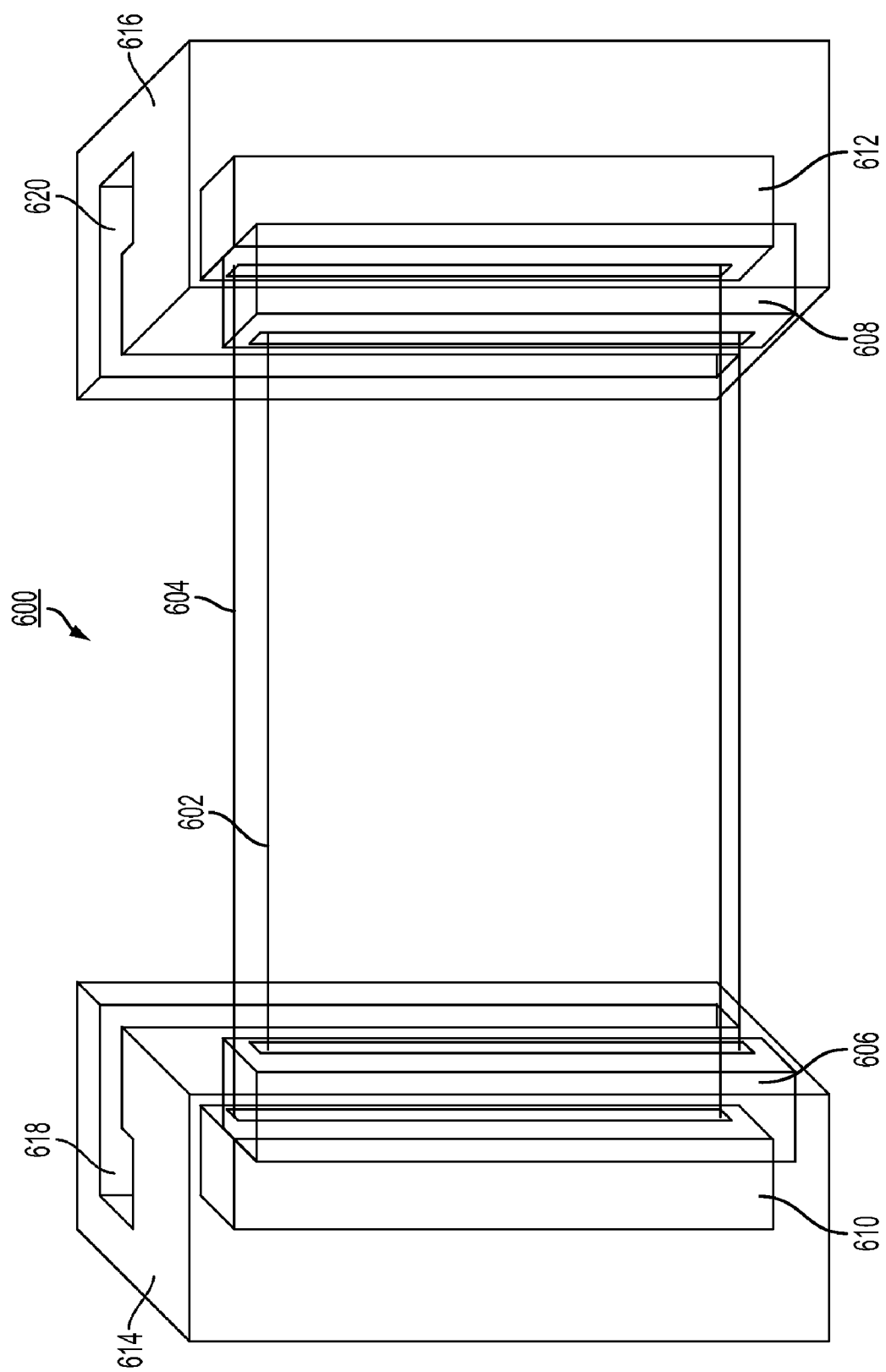
FIG. 13 is a first available configuration of a slide-out information display utilizing flexible display membranes.

With reference now to FIG. 13, a first available configuration of a slide-out information display 600 utilizing flexible display membranes is shown. The information display 600 includes a first flexible display membrane 602 and a second flexible display membrane 604 having the first display membrane positioned slightly in front of the second display membrane as shown or viewed in the figure. The first flexible display membrane 602 is stored in respective left and right scrolling assemblies 606, 608. It is to be appreciated that, although two scrolling assemblies are shown in the figure, alternate embodiments may incorporate only one scrolling assembly, i.e., on other words, one end of the display membrane is fixed and scrolling occurs by the one scrolling assembly. The second flexible display membrane is similarly stored in left and right scrolling assemblies 610, 612 and alternate embodiments may also be configured utilizing only one scrolling assembly for the second flexible display membrane 604.

In order for the flexible display membranes 602, 604 to be operable, they must be sufficiently rigid so as to provide a constant display area, yet sufficiently flexible so as to allow individual sections of the display to be deformed by rolling onto the scrolling assembly mechanisms, where required. The membranes 602, 604 will generally be built upon a layer of material that constitutes a structural substrate for the other components of the display membrane. The material must have thermal characteristics (such as melting point) and chemical characteristics such that it will withstand the fabrication processes of the various components of the display membrane that are built on top of it. The structural substrate material must also have mechanical properties that are suitable to the kind of deformation required by the specific display embodiment. The membranes 602, 604 may accordingly include one or more structural substrate layers made of any of the following: a low elasticity material, such as a metal foil; and a high elasticity material, such as a plastic or polymer.

In certain embodiments, the membranes 602, 604 may include control layer components and addressing circuitry for addressing the display pixels that form a visual display area along the display membranes 602, 604. In conventional display systems, individual circuit elements used in the addressing circuitry are often not fabricated in a manner that is suited for building collapsible displays. For example, construction of active-matrix liquid-crystal displays (LCDs), such as those commonly used as personal computer monitors, typically involves a fabrication process for building thin-film transistor (TFTs) in which silicon is deposited on thin glass sheets. The glass has thermal and chemical characteristics that are desirable for that fabrication process, but the glass sheets are at best semi-rigid. As another example, commercial displays have been built using bi-stable dielectric twisting-ball (gyricon) display elements. Many of these displays have been direct-addressed using large-area copper pads on conventional printed circuit boards (PCBs); the copper pads are driven using off-board control logic.

PCBs are inexpensive but are entirely rigid. However, several alternative display control technologies are available such that the individual circuit elements (1) are themselves reasonably flexible and (2) can be fabricated using processes suitable for use with flexible structural substrates. There are a variety of such technologies, such as: amorphous silicon transistors fabricated at low-temperature; polysilicon transistors fabricated at low-temperature; organic transistors; and hybrid organic/inorganic transistors. The ability to include transistor elements within a flexible control layer enables the use of active-matrix techniques, which are important if the display layer technology is not bi-stable (see below). Other available components for the control layer will be readily apparent to one of skill in the art.

In further embodiments, the membranes 602, 604 may include display layer components for activating or deactivating an addressed pixel. The display layer elements must be built from materials that are flexible and can be fabricated on flexible substrates. If a control layer is present in the display, the display layer must be controlled by addressing circuit elements that are themselves flexible and can be fabricated on flexible substrates. However, the cholesteric liquid crystal display has attracted attention in recent years as an electronic paper (e-paper) type of display device. The cholesteric liquid crystal display is capable of utilizing reflection from surrounding lights as a light source and has a storage property which can hold display contents after the supply voltage is turned off. Further, because an active matrix is not needed for driving the display, cholesteric liquid crystal display devices are capable of providing cost effective large-capacity displays, and may use a flexible substrate which is particularly suitable for e-paper. An example of such a display is described in U.S. patent application Ser. No. 11/004,752 titled Black/White Cholesteric Bistable Display with Increased White Reflectivity. Such display technologies are often colloquially described using names such as "electric paper," "electronic paper," or "electronic ink" as well as others. Of these technologies, those in which the display elements are bi-stable (hold their image without the application of additional power) are often advantageous in that (1) they facilitate the construction of electronic devices with lower power consumption and therefore longer battery life, and (2) they do not need active-matrix elements to maintain their image. Other available components for the display layer will be readily apparent to one of skill in the art.

In any of the embodiments described below, each of the display membranes 602, 604 may be provided as a single continuous sheet, however, in use, the membranes are aligned to provide the appearance of a continuous display membrane. Various technologies may be provided to conceal, mask or hide otherwise visible edges of the sections within the display area where the membranes are adjacent. U.S. Pat. No. 5,734,513 describes one such technique that may be adapted. In addition to hardware-based edge concealment techniques, software-based techniques can be used to reduce the effect (as perceived by the end user) of having multiple display sections with visible edges between them. For example, U.S. Pat. No. 5,835,090 describes how the position of application windows in a graphic user interface (GUI) can be constrained to always be displayed entirely within one of several display sections if desired.

Although various useful display membranes have been developed and continue to be improved, there have not been many attempts to provide such display membranes in configurations that allow the display to be expanded to larger areas and collapsed to smaller areas. In particular, there have not been proposed various display device geometries that would be useful for providing larger display areas in more than one dimension to portable electronic devices. Most flexible display membranes instead are proposed in the form of single panel displays, simple roll-up displays, aligned-axis fold-up panel displays, or multiple-axis fold-up panel displays, as discussed previously.

Figure 14:
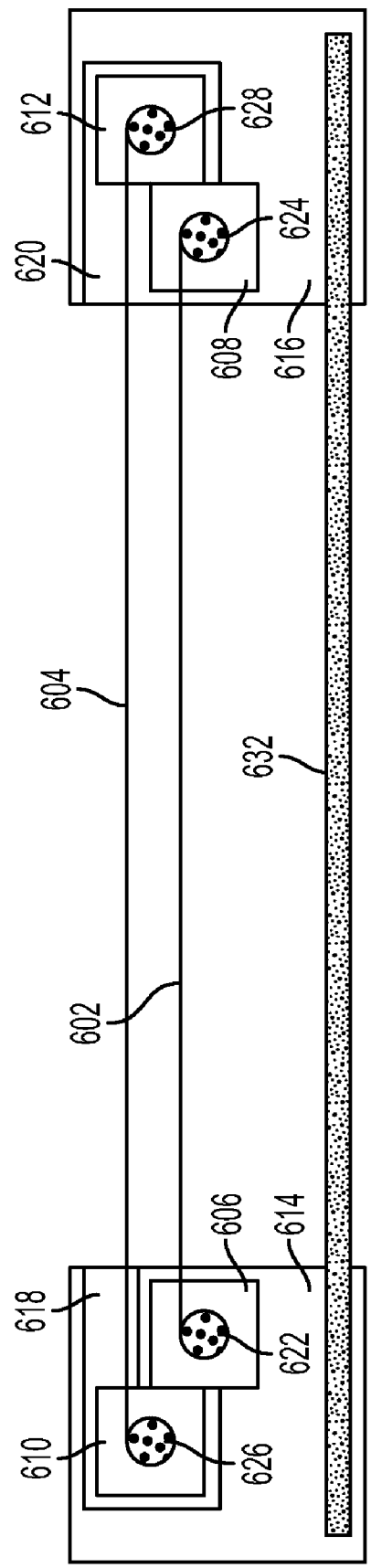
FIG. 14 is a top view of the information display of FIG. 13.

The pair of scrolling assemblies 606, 608 associated with the first flexible display membrane 602 are fixedly mounted in respective housing members 614, 616. In this configuration, however, the scrolling assemblies 610, 612 associated with the second flexible display membranes 604 are moveably housed in respective channels 618, 620 formed within the housing members 614, 616. While FIG. 13 shows an approximate perspective view from the front of the information display 600 as viewed by a user, FIG. 14 shows a top view of the information display including scrolling assembly mechanisms 622-628 and an expanding support 632. It is to be appreciated that the first configuration of the information display utilizing flexible display membranes in FIG. 13 is shown with the housing members 614, 616 extended in a horizontal direction as shown in the figures. When the information display is not in use, the housing members 614, 616 may be closed horizontally while the flexible display membrane 602, 604 are stored in the respective scrolling assemblies 606-612. The scrolling assembly mechanism operation can be facilitated in some embodiments by a spring and cam mechanism such as, e.g., those used in window shades and projection screens as known in the art. The expanding support 632 is provided for supporting the display membranes when the housing members 614, 616 are extended, and is described in more detail below.

Figure 15:
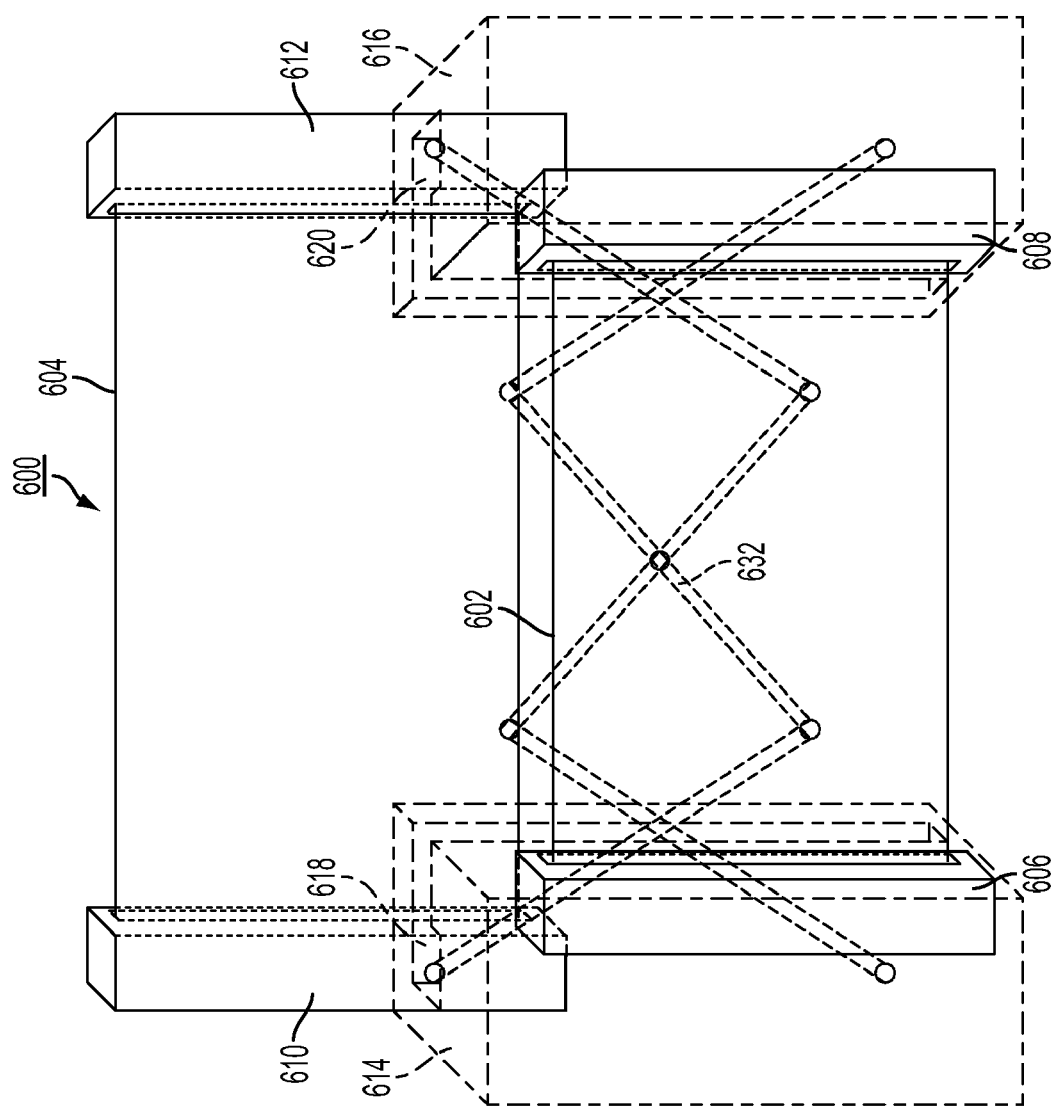
FIG. 15 is the information display of FIG. 13 manually extended in the vertical direction.
Figure 18:
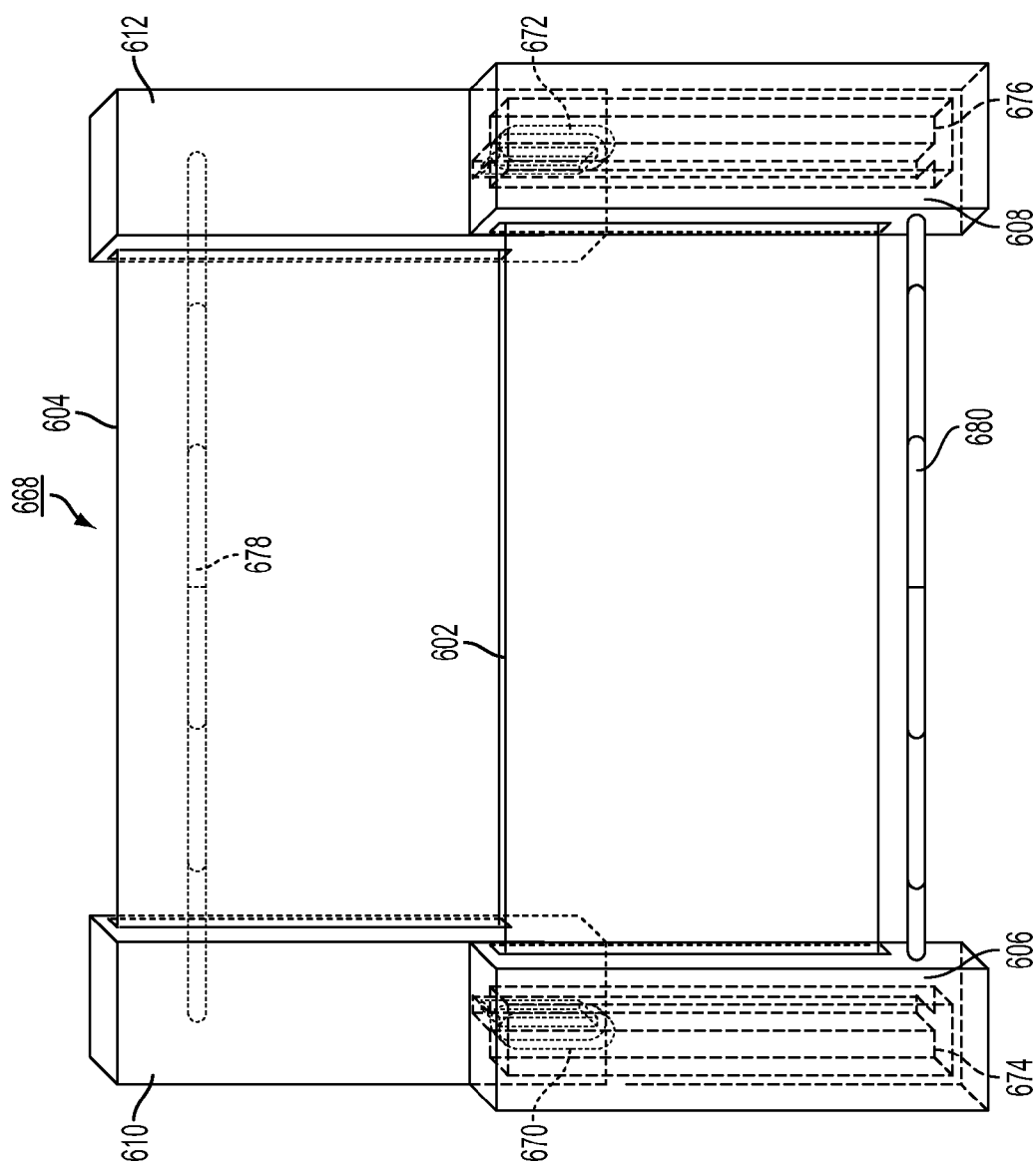
FIG. 18 is a fourth available configuration of a slide-out information display utilizing flexible display membranes.
Figure 19:
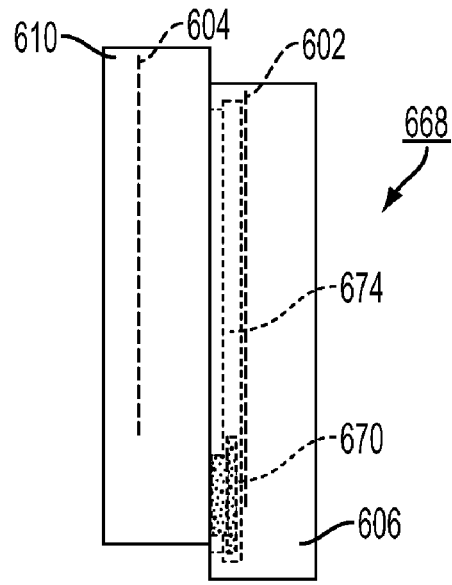
FIG. 19 is a side view of the information display of FIG. 18 in a collapsed position.
Figure 20:
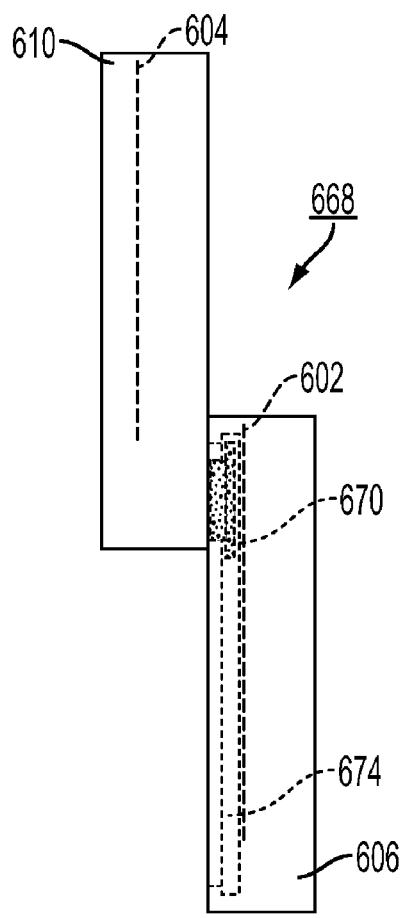
FIG. 20 is a side view of the information display of FIG. 18 in an extended position.

With reference now to FIG. 15, the information display 600 is shown manually extended in the vertical direction with scrolling assemblies for the second flexible display membrane 604 extended in their respective channels 618, 620 in a vertical direction (more details on connection for vertical movement are set out in FIGS. 18-20 and the associated discussion). In this embodiment, the scrolling assemblies 610, 612 are slidably mounted in the channels 618, 620 so that they can be manually extended or pulled in a direction essentially parallel to the plane of the display membranes. The scrolling assemblies 610, 612 may be mounted so that there is sufficient friction to support the scrolling assemblies in their extended and/or collapsed positions. Other suitable means for supporting the scrolling assemblies 610, 612 such as, e.g., by the use of catches or cams and detents may also be used in some embodiments. This configuration advantageously increases the viewing area in both the horizontal and vertical directions. It is generally desirable to also include a rigid or semi-rigid support assembly for the flexible display membranes of some kind. The previously mentioned expanding support assembly 632 can be support rods 510 as shown in FIG. 6, telescoping rods like those used, e.g., for antennas or any other mechanism that serves the function of guiding and supporting the expanding information display device and flexible display membranes. For example, an accordion style expanding support 632 is shown in FIG. 15.

Figure 16:
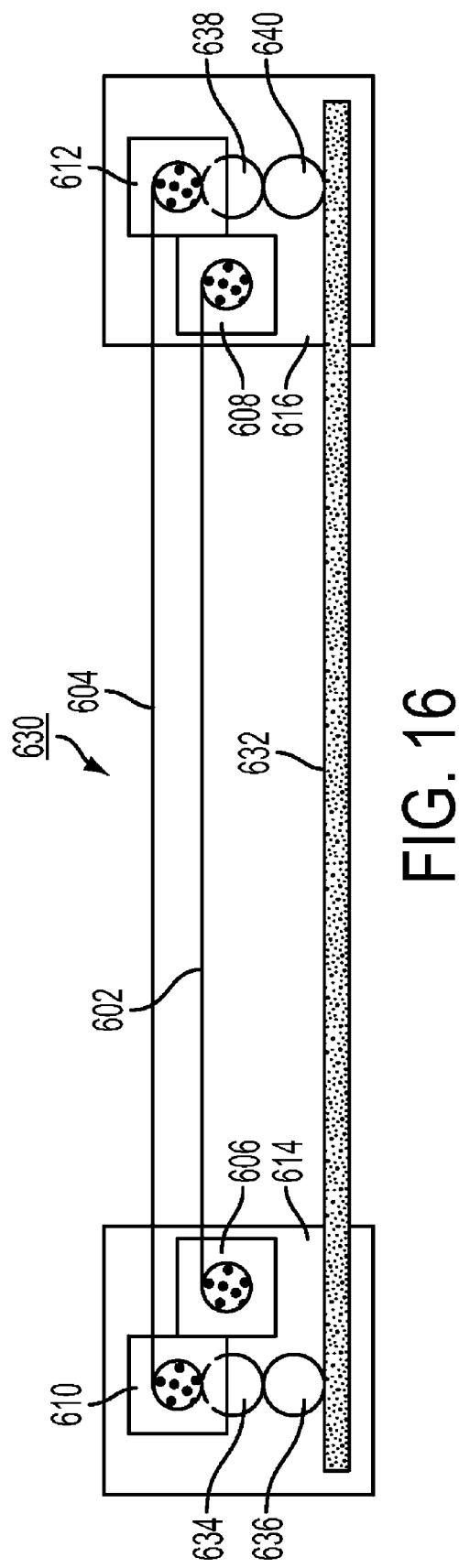
FIG. 16 is a second available configuration of a slide-out information display using flexible display membranes.

With reference now to FIG. 16, and continuing reference to FIG. 15, a second available configuration of a slide-out information display using flexible display membranes is shown. The slide-out display 630, as before, includes first and second flexible display membranes 602, 604. Also included is an expanding support assembly 632 and the scrolling assemblies 606-612. While the previous embodiment shown in FIG. 15 required manual extension of the scrolling assemblies 610, 612 in the vertical direction, the slide-out display 630 of FIG. 16 provides for automatic extension of the scrolling assemblies 610, 612 in the following manner. In this embodiment, as the housing members 614, 616 are separated, a driver mechanism coupled with the expanding support 632 extends the scrolling assemblies 610, 612 as previously described. In this exemplary embodiment, a rotating head 634 of the scrolling assembly 610 coupled with a second rotating head 636 which is coupled to the expanding support assembly 632. A second set of rotating heads 638, 640 is provided for extending the second scrolling assembly 612. The rotating head 636 may be coupled to the expanding support assembly 632 by a variety of means. For example, the rotating head can be a gear which engages a rack gear mounted on, or formed into, the support assembly. When the rotating head 636 is a gear, the rotating head 634 coupled to the scrolling assembly 610 may also be a gear which couples to the scrolling assembly by means of a worm gear arrangement. In embodiments where the rotating head 636 coupled to the expanding support 632 is sufficiently proximate to the scrolling assembly 610, the second rotating head 634 may be eliminated, and the first rotating head 636 may be formed with an additional worm gear for extending the scrolling assembly 610. Other arrangements as known in the art may also be used.

Figure 17:
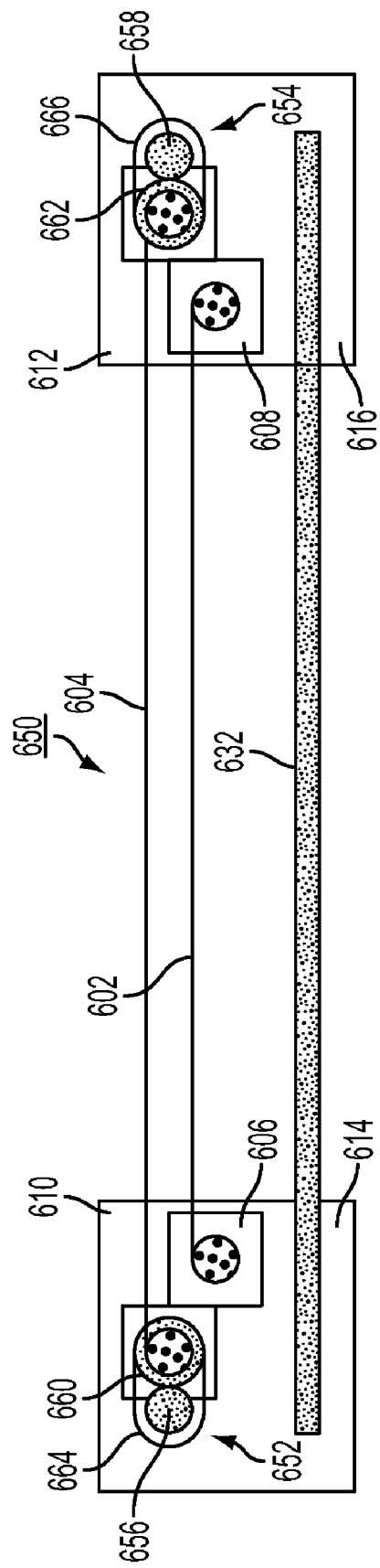
FIG. 17 is a third available configuration of a slide-out information display utilizing flexible display membranes.

With reference now to FIG. 17, a third available configuration of a slide-out information display utilizing flexible display membranes is shown. Like the previous embodiment, this embodiment of the slide-out display 650 automatically extends the scrolling assemblies 610, 612 as the housing assemblies 614, 616 are separated. In this embodiment, however, driver mechanisms 652, 654 are coupled to operation of a roller unit of the scrolling assemblies 610, 612. For example, as the flexible display membranes play out, roller units in the scrolling assembly 610, 612 cause heads 656, 658 to rotate in turn and extend the scrolling assemblies 610, 612. Alternately, a rotating head 660, 662 in the scrolling assembly can be coupled by a mechanism such as drive belts 664, 666 to the rotating heads 656, 658 which extend the scrolling assemblies 614, 616. The coupling mechanisms can be implemented in a variety of ways known in the art. Various combinations of known methods in the art of transmitting mechanical force between objects moving in different directions, such as, e.g., threaded screw heads, drive belts, hydraulic mechanisms, and so on, can be used.

With reference now to FIG. 18, a fourth available configuration 668 of a slide-out information display utilizing flexible display membranes is shown. This configuration is a manual configuration similar to the embodiments shown with reference to FIGS. 13-15, however, without housing members. In this embodiment, the scrolling assemblies 610, 612 are also slidably mounted so that they can be manually extended or pulled in a direction essentially parallel to the plane of the display membranes. However, in this fourth configuration, each of the extendable scrolling assemblies 610, 612 is formed with a tab 670, 672 which extends from the face of the respective scrolling assembly. Each tab 670, 672 slides in a channel 674, 676 formed in the respective remaining scrolling assembly 606, 608. This configuration is further shown with separate telescoping support members 678, 680 so that each pair of scrolling assemblies is supported.

With reference now to FIGS. 19-20, and continuing reference to FIG. 18, a side view of the fourth available configuration 668 is shown in order to clarify the manual extension of the scrolling assemblies 610, 612. In order to not complicate the drawing, only the left side scrolling assemblies 606, 610 are shown in the figure. FIG. 19 shows the display 668 in a collapsed configuration with the tab 670 in a lower portion of the channel 674. After manually extending the scrolling assemblies, as shown in FIG. 20, the tab 670 is in the upper portion of the scrolling assembly 606, and the second display membrane 604 is now extended above the first display membrane 603, with a slight offset to the left as shown.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A roll-up display device, comprising:
a first flexible display membrane (602);
first and second scrolling assemblies (606, 608), the first scrolling assembly including a rotatably mounted first scrolling assembly mechanism (622) for rolling up the first flexible display membrane and the second scrolling assembly including a rotatably mounted third scrolling assembly mechanism (624), the first and third scrolling assembly mechanisms configured for rolling up opposite ends of the first flexible display membrane;
a second flexible display membrane (604);
third and fourth scrolling assemblies (610, 612), one of the third and fourth scrolling assemblies including a second rotatably mounted scrolling assembly mechanism (626/628) for rolling up the second flexible display membrane, and the remaining one of the third and fourth scrolling assemblies including a fourth rotatably mounted scrolling assembly mechanism (628/626), the second and fourth scrolling assembly mechanisms configured for rolling up opposite ends of the second flexible display membrane the third and fourth scrolling assemblies movable in a direction that can extend beyond the first and second scrolling assemblies, the second display membrane being covered by the first display membrane when the third and fourth scrolling assemblies are not extended, and the second display membrane being uncovered when the third and fourth scrolling assemblies are extended, thereby providing an enlarged viewing area.

2. The roll-up display device of claim 1, further comprising:
first and second housing members (614, 616) configured to hold the first and second and third and fourth scrolling assemblies;
an expanding support assembly (632) interconnecting and supporting the first and second housing members;
a first rotating head arrangement (634, 636) coupled to the third scrolling assembly;
a second rotating head arrangement (638, 640) coupled to the fourth scrolling assembly, the first and second rotating head arrangements further coupled to the expanding support assembly for automatically extending the third and fourth scrolling assemblies when the first and second housing members are separated, and automatically retracting the third and fourth scrolling assemblies when the first and second housing members are brought together.

3. The roll-up display device of claim 1, further comprising:
driver mechanisms 652, 654 are coupled to operation of a roller unit of the scrolling assemblies 610, 612;
a first driver mechanism (652) coupled to a first rotating head (660) of the second scrolling assembly mechanism;
a second driver mechanism (654) coupled to a second rotating head (662) of the fourth scrolling assembly mechanism, the first and second driver mechanisms further coupled to the respective third and fourth scrolling assemblies for automatically extending the third and fourth scrolling assemblies when the first and second housing members are separated, and automatically retracting the third and fourth scrolling assemblies when the first and second housing members are brought together.

4. A method for forming a roll-up display, the method comprising:
providing first and second scrolling assemblies (606, 608), the first scrolling assembly including a rotatably mounted first scrolling assembly mechanism (622) for rolling up a first flexible display membrane (602) and the second scrolling assembly (608) includes a rotatably mounted third scrolling assembly mechanism (624), the first and third scrolling assembly mechanisms configured for rolling up opposite ends of the first flexible display membrane (602);
providing third and fourth scrolling assemblies (610, 612), one of the third and fourth scrolling assemblies including a second rotatably mounted scrolling assembly mechanism (626) for rolling up a second flexible display membrane (604), and the remaining one of the third and fourth scrolling assemblies (612) including a fourth rotatably mounted scrolling assembly mechanism (628), the second and fourth scrolling assembly mechanisms configured for rolling up opposite ends of the second flexible display membrane, the third and fourth scrolling assemblies being movable in at least one direction and extendable beyond the first and second scrolling assemblies, the second display membrane being covered by the first display membrane when the third and fourth scrolling assemblies are not extended, and the second display membrane being uncovered when the third and fourth scrolling assemblies are extended by a user, thereby providing an enlarged viewing area.

5. The method set forth in claim 4, the method further including the steps of:
mounting the first and second scrolling assemblies (606, 608) in first and second housing members (614, 616);
mounting the third and fourth scrolling assemblies (610, 612) in the first and second housing members (614, 616).

6. The method set forth in claim 5, further comprising:
interconnecting and supporting the first and second housing members with an expanding support assembly (632);
coupling a first rotating head arrangement (634, 636) to the third scrolling assembly;
coupling a second rotating head arrangement (638, 640) to the fourth scrolling assembly, and further coupling the first and second rotating head arrangements to the expanding support assembly for automatically extending the third and fourth scrolling assemblies when the first and second housing members are separated and automatically retracting the third and fourth scrolling assemblies when the first and second housing members are brought together.

7. The method set forth in claim 5, further comprising:
coupling a first driver mechanism (652) to a first rotating head (660) of the second scrolling assembly mechanism;
coupling a second driver mechanism (654) to a second rotating head (662) of the fourth scrolling assembly mechanism, and further coupling the first and second driver mechanisms to the respective third and fourth scrolling assemblies for automatically extending the third and fourth scrolling assemblies when the first and second housing members are separated and automatically retracting the third and fourth scrolling assemblies when the first and second housing members are brought together.

8. An expanding electronic display, comprising:
a first display section (602);
first and second scrolling assemblies (606, 608), the first scrolling assembly including a rotatably mounted first scrolling assembly mechanism (622) for rolling up the first display section and the second scrolling assembly including a rotatably mounted third scrolling assembly mechanism (624), the first and third scrolling assembly mechanisms configured for rolling up opposite ends of the first display section;
a second display section (604), configured to be hidden from view when the expanding electronic display is in a first position;
third and fourth scrolling assemblies (610, 612), one of the third and fourth scrolling assemblies including a second rotatably mounted scrolling assembly mechanism (626/628) for rolling up the second display section, and the remaining one of the third and fourth scrolling assemblies including a fourth rotatably mounted scrolling assembly mechanism (628/626), the second and fourth scrolling assembly mechanisms configured for rolling up opposite ends of the second display section, the third and fourth scrolling assemblies movable in a direction that can extend beyond the first and second scrolling assemblies, the second display section being covered by the first display section when in the first position and the third and fourth scrolling assemblies are not extended, and the second display section being uncovered when the third and fourth scrolling assemblies are extended,
such that at least one of the first display section and the second display section is movable into a relationship with the remaining display section which permits viewing of both the first display section and the second display section.

\* \* \* \* \*